United States Patent
Kadambi et al.

(10) Patent No.: US 8,565,240 B2
(45) Date of Patent: *Oct. 22, 2013

(54) FLOW BASED CONGESTION CONTROL

(75) Inventors: Shiri Kadambi, Los Altos Hills, CA (US); Shekhar Ambe, San Jose, CA (US); Mohan Kalkunte, Sunnyvale, CA (US); Sandeep Relan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 100 days.

This patent is subject to a terminal disclaimer.

(21) Appl. No.: 13/237,630

(22) Filed: Sep. 20, 2011

(65) Prior Publication Data

US 2012/0008502 A1   Jan. 12, 2012

Related U.S. Application Data (63) Continuation of application No. 12/729,762, filed on Mar. 23, 2010, now Pat. No. 8,023,413, which is a continuation of application No. 11/727,614, filed on Mar. 27, 2007, now Pat. No. 7,684,330, which is a continuation of application No. 10/173,421, filed on Jun. 18, 2002, now Pat. No. 7,212,534.

(60) Provisional application No. 60/306,870, filed on Jul. 23, 2001.

(51) Int. Cl.
H04L 12/28 (2006.01)

(52) U.S. Cl.
USPC .................................................. 370/395.4

(58) Field of Classification Search
None
See application file for complete search history.

(56) References Cited

U.S. PATENT DOCUMENTS

| 6,563,827 B1 * | 5/2003 | Brueckheimer et al. ... 370/395.1 |
| 6,771,601 B1 * | 8/2004 | Aydemir et al. ............... 370/231 |
| 6,957,269 B2 * | 10/2005 | Williams et al. .............. 709/235 |
| 7,684,330 B2 * | 3/2010 | Kadambi et al. ............. 370/235 |
| 2002/0194400 A1 * | 12/2002 | Porterfield ........................ 710/1 |

* cited by examiner

Primary Examiner — Raj Jain
(74) Attorney, Agent, or Firm — Thomas | Horstemeyer, LLP.

(57) ABSTRACT

A method for selectively controlling the flow of data through a network device is discussed. The network device has a plurality of ports, with each port of the plurality of ports having a plurality of priority queues. Congestion at one priority queue of the plurality of priority queues is detected and a virtual channel message is sent to other network devices connected to the network device causing data destined for the one priority queue to be halted. After the congestion at the one priority queue has abated, a virtual channel resume message is sent to the other network devices.

20 Claims, 8 Drawing Sheets

(HOL Avoidance Mode)

(Zero-Loss Mode)

Fig. 1

(HOL Avoidance Mode)

| Bit | 31 30 29 28 27 26 25 24 23 22 21 20 19 18 17 16 15 14 13 12 11 10 9 8 7 6 5 4 3 2 1 0 | |
|---|---|---|
| +0 | DA | |
| +32 | SA | DA |
| +64 | SA | |
| +96 | RESERVED \| PROTOCOL | ETHERTYPE |
| +128 | VC_TAG | |
| +160 | OPT_PARAMS | |
| Varies | DATA | |

| Field | Bit(S) | Description |
|---|---|---|
| DA | 0:47 | Destination Address, value set from register for control frame |
| SA | 95:48 | Source Address, value set from register for control frame |
| ETHERTYPE | 111:96 | Ethernet Type Field, value set from register |
| PROTOCOL | 119:112 | Subtype of this ether type, must be 1 for VC packet type |
| RESERVED | 127:119 | Reserved, can be used for VC priority or VC tunneling |
| VC_TAG | 159:128 | VC opcode and parameters |
| OPT_PARAMS | 160+ | Optional additional parameters for command |
| DATA | Varies | Data following tag insertion, offset depends on VC command |

Fig. 8

| Bit | 31 30 29 28 27 26 25 24 23 22 21 20 19 18 17 16 15 14 13 12 11 10 9 8 | 7 6 5 4 3 2 1 0 |
|---|---|---|
| +0 | PARAMS | OPCODE0 |

| Field | Bit(S) | Description |
|---|---|---|
| OPCODE0 | 7:0 | Operation opcode. Must be less than 0xFF.<br>0x0　　　　RESERVED<br>0x1　　　　SELECTIVE_FLOW Selective flow control<br>0x2 - 0xFE　RESERVED<br>0xFF　　　INACTIVE Move to opcode1 for evaluation |
| PARAMS | 31:8 | Parameters; format depends on opcode |

Fig. 9

| Bit | 31 30 29 28 27 26 25 24 23 22 21 20 19 18 17 16 | 15 14 13 12 11 10 9 8 | 7 6 5 4 3 2 1 0 |
|---|---|---|---|
| +0 | PARAMS | OPCODE1 | OPCODE0_ALL1 |

| Field | Bit(S) | Description |
|---|---|---|
| OPCODE0_ALL1 | 7:0 | Opcode 0; Must be equal to 0xFF |
| OPCODE1 | 15:8 | Operation opcode. Must be less than 0xFF.<br>0x0            RESERVED<br>0x1            SEL_FLOW_PRIORITY Priority based elective flow control<br>0x2            EGRESS_PRIORITY_FLOW: Flow control based on egress congestion with priority indications<br>0x03 - 0xFE RESERVED<br>0xFF           INACTIVE Move to opcode2 for evaluation |
| PARAMS | 31:16 | Parameters; format depends on opcode1 |

Fig. 10

| Bit | 31 30 29 28 27 26 25 24 23 22 21 20 19 18 17 16 | 15 14 13 12 11 10 9 8 | 7 6 5 4 3 2 1 0 |
|---|---|---|---|
| +0 | OPCODE2 | OPCODE1_ALL1 | OPCODE0_ALL1 |

| Field | Bit(S) | Description |
|---|---|---|
| OPCODE2 | 31:16 | Opcode field for header type 2. Must be less than 0xFFFF.<br>Parameters for these opcodes (if any) must be in words following the VC tag.<br>0x0000 - 0xFFFE     RESERVED<br>0xFFFF                 INACTIVE Move to data for opcode |
| OPCODE1_ALL1 | 15:8 | Opcode 1; Must be equal to 0xFF |
| OPCODE0_ALL1 | 7:0 | Opcode 0; Must be equal to 0xFF |

Fig. 11

| Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| +0 | RESERVED | PRIORITY_BITMAP | OPCODE1_1 | OPCODE0_ALL1 |

| Field | Bit(s) | Description |
|---|---|---|
| OPCODE0_ALL1 | 7:0 | Opcode 0; Must be equal to 0xFF |
| OPCODE1_1 | 15:8 | Value is 0x1 indicating SEL_FLOW_PRIORITY operation |
| PRIORITY_BITMAP | 23:16 | Bit map indicating the congestion state of 802.1p priorities<br>Bit states indicate:<br>0   No congestion for this priority. De-assert flow control for this priority<br>1   Congestion present for this priority. Assert flow control for this priority |
| RESERVED | 31:28 | Reserved |

| Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| +0 | RESERVED | PRIORITY_BITMAP | OPCODE1_2 | OPCODE0_ALL1 |
| +32 | FLOW_ID ||||
| +64 | FLOW_ID ||||
| +96 | EGRESS_BITMAP ||||
| +128 | EGRESS_BITMAP ||||

| Field | Bit(s) | Description |
|---|---|---|
| OPCODE0_ALL1 | 7:0 | Opcode 0 field must have value of 0xFF |
| OPCODE1_2 | 15:8 | Opcode 1 field with value of 2 indicates an egress-priority flow assert operation. The ports indicated in the EGRESS_BITMAP are congested for the priority indicated in the PRIORITY_BITMAP. This is paired with the indicated flow id (which may be the destination MAC address for the packet.) |
| PRIORITY_BITMAP | 23:16 | Bitmap of priorities for the given egress(es) which are congested. This can be treated as an abstract bitmap since the priorities may be remapped in the switch. In general, only one bit in this bitmap should be set |
| RESERVED | 31:24 | Reserved |
| FLOW_ID | 32:95 | 64-bit field to indicate the flow id. The exact format and mechanism for generation is to be determined (probably through negotiation between the endpoints). One example would be the destination MAC address. |
| EGRESS_BITMAP | 96:159 | 64-bit port bitmap for congested egress ports |

Fig. 15

| Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| +0 | RESERVED | PRIORITY_BITMAP | OPCODE1_2 | OPCODE0_ALL1 |
| +32 | FLOW_ID ||||
| +64 | FLOW_ID ||||

| Field | Bit(s) | Description |
|---|---|---|
| OPCODE0_ALL1 | 7:0 | Opcode 0 field must have value of 0xFF |
| OPCODE1_3 | 15:8 | Opcode 1 field with value of 3 indicates an egress-priority congestion cleared operation. The ports indicated in the EGRESS_BITMAP are now uncongested for the priority indicated in the PRIORITY_BITMAP |
| PRIORITY_BITMAP | 23:16 | Bitmap of priorities for the given egress(es) which are congested. This can be treated as an abstract bitmap since the priorities may be remapped in the switch. In general, only one bit in this bitmap should be set |
| RESERVED | 31:24 | Reserved |
| EGRESS_BITMAP | 32:95 | 64-bit port bitmap. Indicates ports that have transitioned to uncongested for the given priority. |

FLOW BASED CONGESTION CONTROL

CROSS-REFERENCE TO RELATED APPLICATIONS/INCORPORATION BY REFERENCE

The present application is a CONTINUATION of U.S. patent application Ser. No. 12/729,762, filed Mar. 23, 2010, which is a CONTINUATION of U.S. application Ser. No. 11/727,614, filed Mar. 27, 2007, now U.S. Pat. No. 7,684,330, which is a CONTINUATION OF U.S. application Ser. No. 10/173,421, filed Jun. 18, 2002, now U.S. Pat. No. 7,212,534. Said U.S. application Ser. No. 10/173,421 makes reference to, claims priority to and claims benefit from U.S. Application No. 60/306,870, filed Jul. 23, 2001. The above-identified applications are hereby incorporated herein by reference in their entirety.

BACKGROUND OF THE INVENTION

1. Field of Invention

The present invention relates to a method and apparatus of selectively exchanging control and state information between network devices. The control and state information is exchanged via a frame that is scalable to support many different applications. More specifically, a technique building upon the use of virtual channels for achieving the control of certain data flows through the network device, without blocking the flow of other data through the same link, effectively increasing the bandwidth utilization of the link and the throughput of the network device.

2. Description of Related Art

Many types of network devices are necessary to allow a network to function properly. One such network device is commonly referred to as a switch. A switch is defined as a network component that receives incoming data, stores the data temporarily, and sends the data back out on another port. The switching is accomplished by determining a destination address from the incoming data and sending the data to a port or set of ports associated with the destination address. The control and monitoring of a switch is essential in handling the flow of data in high speed networks. One such function is the control of the selective flow of data through the switch in response to congestion, either internal or external to the switch.

Figure 1:
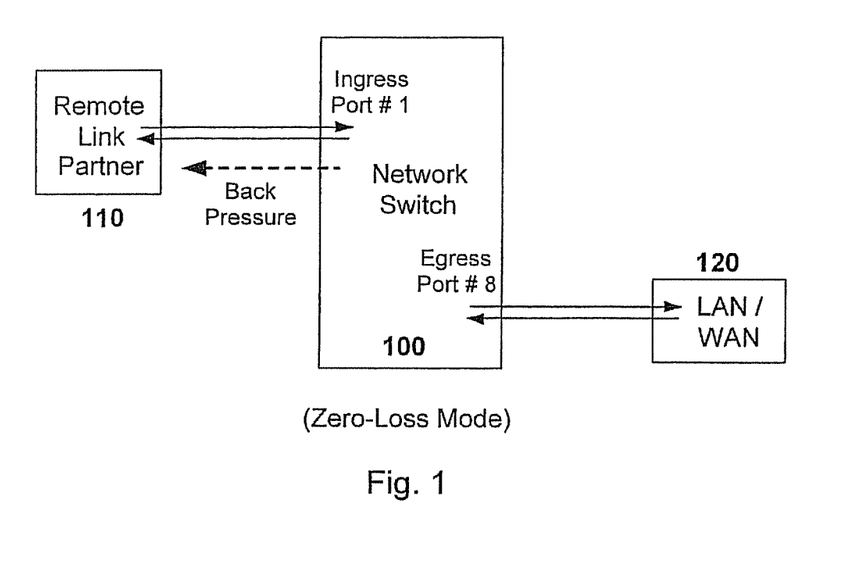
FIG. 1 illustrates a Zero-Loss process of dealing with congestion in a network switch.

Ethernet switches generally support two common mechanisms to handle resource congestion inside the switch. This Ingress backpressure mechanism enables the switch to flow control the traffic sent by a remote link partner, i.e. another end station or another switch. This process is illustrated in FIG. 1. The Ethernet Switch 100 keeps track of the number of packets or cells received on each Ingress Port, such as Port #1 connected to remote link partner 110. If the number of bytes or cells received on an Ingress Port exceeds the configurable Ingress Back Pressure threshold, then the switch exerts Back Pressure. In another technique, if the number of packets received on an Egress Port, such as Egress Port #8 connected to the local or wide area networks 120, exceeds a pre-configured threshold value, then egress generates an Ingress Back Pressure request to the Ingress port.

In Full Duplex mode, this Back Pressure is achieved by sending a MAC control frame called a Pause Frame. Upon receiving the Pause Frame, the remote link partner stops sending further packets until the timer specified in the Pause Frame expires or the switch explicitly sends Resume Frame (Pause Frame with Timer=0). Thus, the entire link remains idle until communication resumes. This flow control mechanism on a full duplex port is specified in the IEEE std 802.3x, in which it has been specified that an ingress port in a full duplex mode should send Pause Frames for flow control.

In Half Duplex mode, this Back Pressure mechanism can be achieved by enabling a Jamming signal and thereby preventing any other station from sending the packet. For ports that are in half duplex mode, this prevents any other station from sending packets to the port. The enabling of jamming signal in half duplex is not a standard, but is done by many of the switch vendors.

These techniques help in avoiding losing any packet that was being received and forwarded by the ingress port and it is generally termed as a Zero-Loss mode of switching, or as a Zero Packet Loss mode of switching. This process has other side effects, however, including an adverse impact on the switch's throughput and wire speed switch rate.

Figure 2:
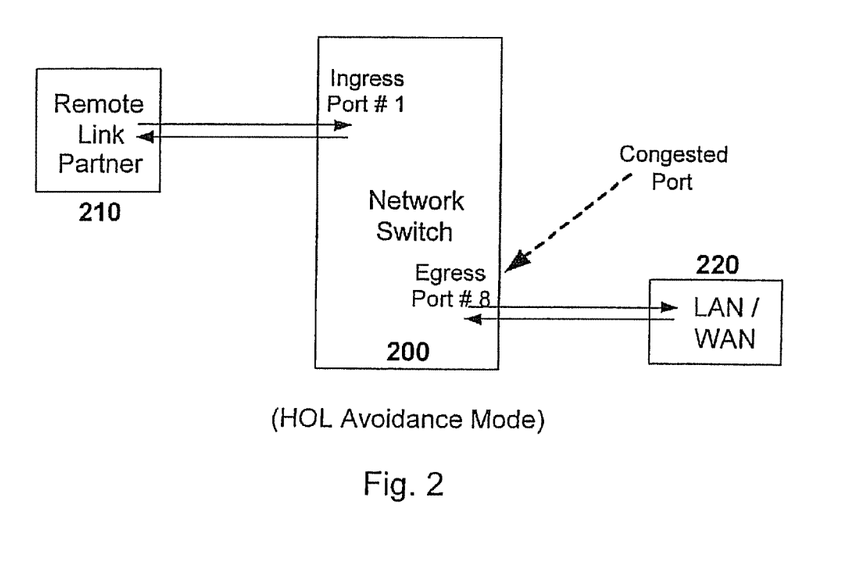
FIG. 2 illustrates the HOL avoidance process of dealing with congestion in a network switch.

In addition, Ethernet switches also support a mechanism to handle Head Of Line (HOL) blocking avoidance. This mechanism is illustrated in FIG. 2. The switch 200 keeps track of number of bytes or cells that are sitting on an Egress Port, such as Egress Port #8 connected to the local or wide area networks, or any type of networks 220. If the number of bytes or cells or packets exceed the Head Of Line (HOL) threshold value then all packets going to that Egress port are dropped at the Ingress port itself (such as Port #1 connected to remote link partner 210). The HOL values are generally configured by software depending on the size of the packet memory. This is generally termed as a HOL avoidance mode of switching. In this HOL avoidance mode, switch performance is sustained by sacrificing packets.

In a Zero-Loss mechanism, the switch never drops any packet for any traffic scenario, the worst case being all ingress ports are sending packets to one egress port. In this Zero-Loss mode, the switch will hit the Ingress Back Pressure threshold before hitting the Egress HOL limit, so that it exerts Ingress Back Pressure rather than dropping packet going to the congested port. As such, there are disadvantages to both types of mechanisms used for controlling the flow of data through a switch.

In terms of providing actual control of the flow of data through a network device, the above processes are often crude with respect to the aspects they allow to be controlled. The present implementations can achieve zero-packet loss but the throughput of the network is often decreased. Alternatively, implementations dealing with Head Of Line blocking can sustain throughput, but the loss of packets increases. Thus, there is a need for a mechanism in a network device that achieves Zero-Loss processing of data that does not have the detrimental effects on the performance of the network device found in the prior art processes. Additionally, there is also a need for selective flow control mechanism that can also be utilized to allow the flow of data having a certain priority to be unimpeded.

SUMMARY OF THE INVENTION

It is an object of this invention to overcome the drawbacks of the above-described conventional network devices and methods. The above control and monitoring of the processes of a network device can be accomplished through the establishment of virtual channels between network devices. These virtual channels allow for the selective control of flows through the network device. The control of the flows can be based on either egress or ingress ports or any internal programmable parameter.

According to one aspect of this invention, a method for selectively controlling the flow of data through a network device is disclosed. The network device has a plurality of ports, with each port of the plurality of ports having a plurality of priority queues. Congestion at one priority queue of the plurality of priority queues is detected and a virtual channel message is sent to other network devices connected to the network device causing data destined for the one priority queue to be halted. After the congestion at the one priority queue has abated, a virtual channel resume message is sent to the other network devices.

Additionally, congestion may be determined to occur when a number of packets received at the one priority queue exceeds a predetermined value, where the predetermined value may be the backpressure limit threshold for the one priority queue. A virtual channel may be negotiated between the network devices and the other network devices prior to the detection of congestion at one priority queue. The virtual channel message sent to other network devices can include a bitmap showing congestion states of the priority queues, where that bitmap may be a combination of a port bitmap and a priority bitmap.

Preferably the plurality of priority queues correspond to a plurality of flow identification queues and the flow identifications of the flow identification queues are determined through negotiations between the network device and the other network devices. The flow identification queues can be implemented as a link list with the network device and each one of the other network devices. The one priority queue can be an ingress or egress port of the plurality of ports. When it is an ingress port, the priority queue memory for each of the plurality of priority queues is set by a backpressure limit threshold.

Also, when the one priority queue resides on an egress port of the plurality of ports, the flow identification corresponding to one of the flow identification queues is calculated once congestion is detected on the egress port. Furthermore, internal messages can be sent to all of the plurality of ports indicating congestion at the one priority queue, and those ports can in turn send out virtual channel messages indicating congestion to other network devices connected to those ports.

In another aspect of the invention, a method for selectively controlling the flow of data in a network device is disclosed. The method includes receiving a virtual channel message indicating congestion at one priority queue of a port of a remote network device and then halting the transfer of data destined for the one priority queue from the network device. After the congestion at the one priority queue abates, data destined for the one priority queue is sent to the network device.

Additionally, the step of waiting for the congestion at the one priority queue to abate can include awaiting a resume virtual channel message from the remote network device and/or monitoring a pause timer, which is started upon receipt of the virtual channel message and sending data destined for the one priority queue once the pause timer reaches a certain value. Also, the virtual channel between the network device and the remote network device can be negotiated prior to the receipt of the virtual channel message, and the states of congestion of the priority queues may be represented by a bitmap, that is a combination of a port bitmap and a priority bitmap.

Alternatively, the one priority queue can correspond to a flow identification queue, where a flow identification of the flow identification queue is determined through negotiations between the network device and the remote network device and the flow identification queues can be implemented as a link list with the network device and the remote network devices. Also, internal messages can be sent to all ports of the network device indicating congestion at the one priority queue after receiving a virtual channel message.

In another aspect of the invention, a network device for selectively controlling the flow of data through the network device is also disclosed. The device includes a plurality of ports, with each port of the plurality of ports having a plurality of priority queues. The device has means for detecting congestion at one priority queue of the plurality of priority queues and means for sending and receiving a virtual channel message indicating congestion at the one priority queue or other priority queue of other network devices connected to the network device. The device further includes means for selectively sending data destined for the one priority queue or other priority queue based on the virtual channel message and means for sending and receiving a virtual channel resume message.

Also, the device may include means for determining that the congestion is occurring when a number of packets received at the one priority queue exceeds a predetermined value, where the predetermined value may be a backpressure limit threshold for the one priority queue. Means for negotiating a virtual channel between the network devices and the other network devices and means for sending and receiving a bitmap showing congestion states of the priority queues may also be included in the device.

The plurality of priority queues can correspond to a plurality of flow identification queues of data, where the flow identifications of the flow identification queues are determined by negotiation means exchanging data between the network device and the other network devices. The flow identification queues are implemented as a link list with the network device and each one of the other network devices.

The means for detecting congestion at one priority queue can detect congestion of an ingress port or an egress port of the plurality of ports. A priority queue memory for each of the plurality of priority queues can be set by a backpressure limit threshold. Also, a flow identification corresponding to one of the flow identification queues can be calculated once congestion is detected on the egress port. The device may also have means for sending internal messages to all of the plurality of ports indicating congestion at the one priority queue when the means for detecting congestion at one priority queue detects congestion and the means for sending and receiving the virtual channel message may be configured to send the virtual channel message to other network devices based on internal messages sent by the means for sending internal messages.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

A Virtual Channel (VC) protocol is intended for exchange of proprietary control between network devices such as switches, routers, network interface cards (NICs), cable modems and related devices. The VC protocol, according to an embodiment of the invention, enables value add functions such as selective flow control, operations, administration and maintenance (OAM) functions, in-band management and many other functions between network devices. The VC protocol can be applied to any media between network devices that are so configured.

The VC protocol has many applications, including selective flow control, in-band management, rate control, traffic shaping, device detection, OAM functions, remote monitoring, and remote alarms.

A primary example discussed herein is directed to Selective Flow Control (SFC). The IEEE 802.3 standard (std) defines link level flow control between two Ethernet devices. For example, if a switch port is congested, it can send a flow control frame to the remote end to stop all incoming traffic. However, if the remote is sending both delay sensitive and delivery sensitive traffic, it is desirable to flow control only the delivery sensitive traffic and not the delay sensitive traffic. This is the feature referred to as Selective Flow Control.

Figure 3:
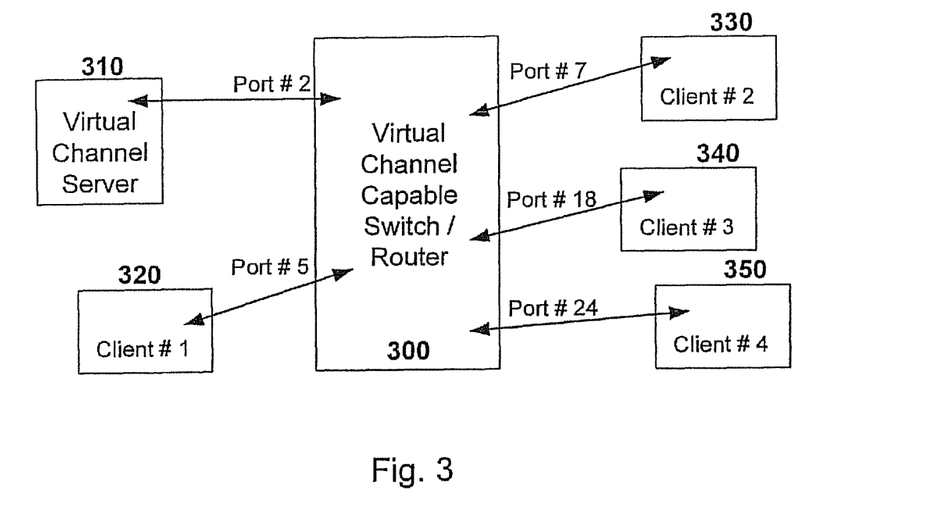
FIG. 3 illustrates a Virtual Channel (VC) capable network device linked with remote link partner.

In FIG. 3, a VC capable Server 310 is connected to a VC capable Switch 300 on port 2 and its clients 320-350 are connected on switch ports 5, 7, 18 and 24. As an example, if client #3 creates congestion on port 18 and port 18 hits the egress congestion threshold, the egress will inform the ingress port 2 of the congestion. Using the VC flow ID (identification) technique, Port 2 sends a VC frame to Server 310 indicating congestion for the given flow ID. The Server in turn will stop sending any packets for that Flow ID (mapped to the egress port 18); thereby there will be no packet loss for packets going to egress port 18. Now, the server can continue sending packets to other clients connected to other egress ports, thereby the link bandwidth is fully utilized.

Another important application of VC protocol is in-band management. This functionality permits a management agent to control a device through a port, rather than through a dedicated bus, such as Peripheral Component Interconnect (PCI). In particular, an internal, VC enabled port can provide full access to the register and memory space of the device, as well as provide the ability to set up remote monitoring, RMON-like trap conditions which will generate an alert by sending a VC frame. The device can then be fully managed without the need for a dedicated CPU.

The architectural paradigm for the VC framework is as follows. The framework enables most common applications and has a minimal impact on link bandwidth. The VC is enabled based on a hardware mechanism with optional software control and the VC does not violate any layer standard (IEEE, IETF). The framework is flexible to allow multiple applications and functions, the architecture is scalable for complex applications and enables customer specific applications to provide differentiation among system vendors using VC-capable devices.

Each of the local and remote sides must indicate it is VC capable. This is accomplished by a three-way handshake. Once the local and remote sides are VC aware, a mechanism is necessary to pass application specific information between the local and remote devices. This is accomplished through a VC frame, which contains all the relevant control information.

When a device supporting VC establishes a link, it should determine whether its link partner is VC capable, and, if so, what functionality to activate. Two of the mechanisms, which are proposed to establish this are: using the three-way VC Handshake mechanism and/or using the Next Page capability of Auto-negotiation.

Once the capabilities are exchanged, VC control frames are sent to execute the supported functionalities. The actual triggering of the VC frame is dependent on several factors including the application, the state of the device and implementation dependencies.

VC Handshake

The VC Handshake is performed by the exchange of proprietary frames. It has at least two important tasks to perform: 1) to enable the VC mode between the two link partners and to determine common VC capabilities of the two link partners.

The VC Handshake Mechanism is for Full Duplex ports and is based on the 802.3x Pause Control Frame used for flow control, as specified in the std. 802.3x. This mechanism has distinct advantages, including being 100% compatible with IEEE standard devices (non-VC mode) and 100% forward compatible with the future VC framework. The mechanism is extensible to new Ethernet standards (10 GE), is independent of Media type (copper, Fiber, etc.), is a hardware based handshake mechanism and has the flexibility to fine tune the Handshake parameters using software.

The VC Handshake specification expands upon the MAC Pause control Frames. It has the following requirements. The Handshake should be initiated immediately after link-up, which is after the completion of the auto-negotiation process. The Handshake may be initiated by each link partner. It should only be initiated on links in Full Duplex mode.

Figure 4:
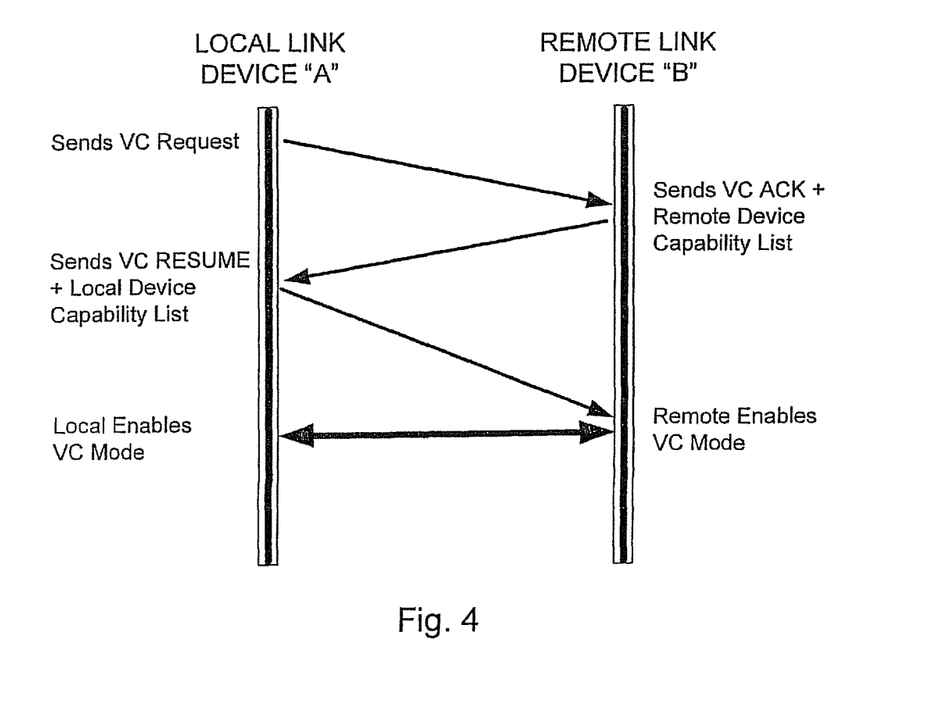
FIG. 4 illustrates an example of VC three-way handshake process.

The VC Handshake is comprised of three steps. To successfully complete the VC Handshake, the third step should be completed. The steps are:

1. REQUEST phase to search for VC compliant link partner. This is initiated by the local side called the Requester;

2. ACK phase to confirm and pass VC feature list to the requestor. This is a response from the remote side, called the Responder; and 3. RESUME phase to complete the handshake and pass requestor's VC feature list. This is sent by the Requester. It indicates the functionality to be supported over this link. These steps are illustrated in FIG. 4.

For all VC Handshake frames, the pause timer field should be set according to the current state of the port. The value used should be the same value that would be used if the port were sending a normal pause frame rather than a VC frame. This ensures that non-VC devices connected to this port will act appropriately.

In general, VC capabilities are asymmetrical and involve sending a specific type of VC control frame and involve obeying that type of VC control frame. In order for VC functionality to be enabled, the VC Handshake may be initiated from both link partners. Each device that is capable of generating VC frames may initiate a VC handshake by sending a VC REQUEST frame. FIG. 4 shows an overview of the packet flow during the VC handshake.

The Request phase, initiated by the local device, is an encoded Pause frame sent to the remote device on the link with pause timer value determined by the current state of the port. The frame format follows the standard pause control frame with following field settings:
 6 byte DA=as specified in standard.
 6 byte SA=REQUEST phase encoding
 2 byte Type=MAC Control: 88-08
 2 byte Op-code=Pause Frame: 00-01
 2 byte Pause Timer value=According to port's state.
 42 byte of "Data Payload"=Reserved (all zeros), and
 4 byte FCS.

Request Phase encoding uses the 6 bytes of "don't care" SA address field of Pause control frame (Bit 40 of SA address set to "0" to avoid multicast source address). The frame encodes the VC REQUEST with following bit assignment, also shown in FIG. 5:
 Bits 47:40 VC Negotiation Code (VC REQUEST)
 Bits 39:24 VC Device ID
 Bits 23:12 VC Vendor ID
 Bit 11:8 VC Rev ID, and
 Bits 7:0 VC Signature.

For the VC Signature, an 8-bit checksum is calculated (XOR of bytes in header) and is used as a signature. If this checksum is not correct, the frame should be treated as a normal pause frame. The VC Revision ID is an 8-bit VC Specification Revision ID field. It indicates the VC architectural framework compliance of the local device. This Rev ID is useful for backward compatibility as the VC specification evolves. For first Generation devices, the VC Revision ID is "1" and up to a maximum of 255 revisions of VC Specifications is supported.

The VC Vendor ID is an 8-bit Vendor ID field. It indicates the Vendor ID of the VC silicon. The Default value is 0x1. The allocation of the Vendor ID is performed when requested by the customer for a unique Vendor ID. The intent on providing Vendor ID is for system vendors to provide differentiated products and services to their customers. The VC Device Type is a 16-bit field. It is intended to provide an indication of the capabilities of the device by indicating the family to which it belongs.

The VC Negotiation Code is an 8-bit field with bit zero always set to "0" (to avoid a source routed frame). The Negotiation codes are instrumental in conducting the VC handshake mechanism. Support of up to a maximum of 127 unique Negotiation codes is provided. Following are a few example Negotiation codes, with others being developed based on future requirements:
 VC REQUEST (from local to remote)=0x02;
 VC ACK (from remote to local)=0x04;
 VC RESUME (from local to remote)=0x06; and
 Reserved Negotiation code: =0x0.

The local has an internal REQ Retry timer and REQ Retry limits (both programmable by software before link up). The REQ Timer is based on the standard pause timer mechanism, except that it is within the local device. If the local does not receive any VC ACK response from remote before the timer expires, the local device re-sends another VC request. The number of VC REQUEST retried by local is controlled by the REQ Retry limits value. The default for the Internal REQ Retry timer is 0x1FFF and the default for the Internal REQ Retry limits is 3.

The ACKNOWLEDGEMENT (ACK) response phase is an encoded Pause frame sent from the remote (Responder) back to the local (Requester) after receiving the initial VC Request packet. If the remote device does not support the VC protocol, the remote device enters a pause state as per the standard Pause frame. Otherwise, the fields have the following meaning:
 6 byte DA, as specified in std;
 6 byte SA, ACKNOWLEDGEMENT Phase Encoding;
 2 byte Type, MAC Control: 88-08;
 2 byte Op-code, Pause Frame: 00-01;
 2 byte Pause Timer, According to port's state;
 42 byte Payload, VC Capability list; and
 4 byte FCS.

Figures 5, 6:
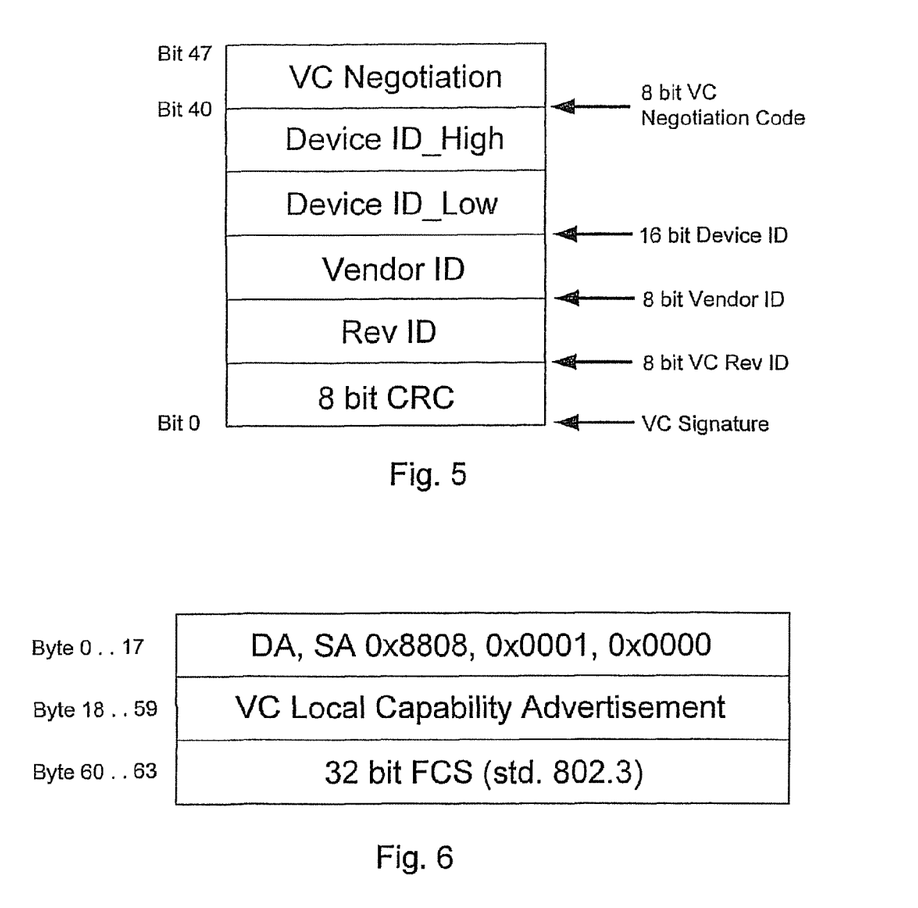
FIG. 5 illustrates an example of VC Handshake REQUEST encoding in the MAC-SA address field of a "Pause Control" Ethernet frame.
FIG. 6 illustrates an example of VC ACK frame format.

With respect to acknowledgement phase encoding, the 6 byte SA field of the remote device VC ACK and the remote VC identification is encoded with exactly the same semantics as the six bytes of SA address field in the VC REQUEST phase. The description of this field is exactly the same as outlined above in the VC REQUEST phase with remote response and shown in FIG. 5. The 42 bytes of data payload is used to encode the remote device VC capability feature list. This is also discussed in more detail below. The ACK Frame Format is illustrated in FIG. 6.

The remote has an internal ACK Retry timer and ACK Retry limits (both programmable by software). The ACK Timer is based on the std. Pause timer mechanism, except that it is within the remote device. If the remote does not receive any VC RESUME response from local before the timer expires, the remote device re-sends another VC ACK. The number of VC ACK sent by remote is controlled by the ACK Retry limits value. As an example, the default for the Internal ACK Retry timer is set to 0x1FFF and the default for the Internal ACK Retry limits is set to 3.

Figure 7:
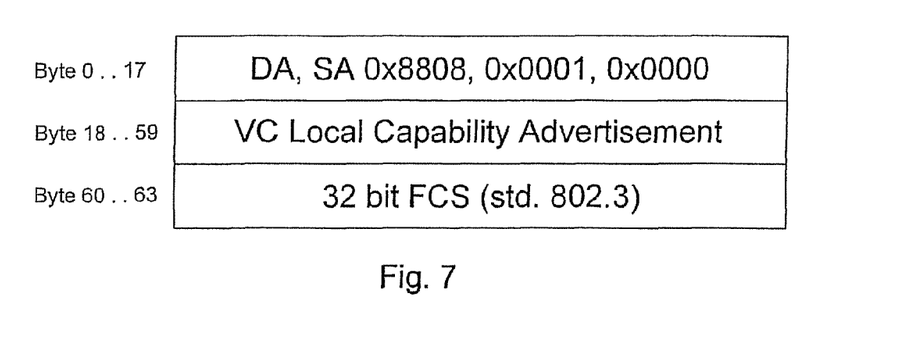
FIG. 7 illustrates an example of VC RESUME frame format.

The RESUME response phase, initiated by the local device, is also an encoded Pause frame sent to the remote with pause timer value determined by the port's current state. After receiving the ACK from the remote device, the local device sends the local capability list in the Resume frame. The 42 bytes of data payload encode the list of VC functions that should be enabled on the link. FIG. 7 shows the RESUME Frame Format. The frame format follows the 802.3 standard for Pause control frames with the following field settings:
 6 byte DA=as specified in std;
 6 byte SA=RESUME phase encoding;
 2 byte Type=MAC Control: 88-08;
 2 byte Op-code=Pause Frame: 00-01;
 2 byte Pause Timer=According to port's state;
 42 byte Payload=Enabled Capability list; and
 4 byte FCS.

The 6 byte SA field of local device VC RESUME and local VC identification is encoded with exactly the same semantics as the six bytes of SA address field in the VC REQUEST phase. The description of this field is exactly the same as outlined in VC REQUEST phase, which is illustrated in FIG. 5.

In addition, the VC architecture is also capable of handling special conditions arising during the VC handshake mechanism. One such condition occurs if the VC REQUEST needs to be retried. If the VC ACK response does not come from the remote, the local re-sends another REQUEST, limited to maximum REQ Retry limit value. If the REQ Retry limit is reached and no ACK has arrived, the local MAC switches to non-VC (standard) mode and supports the standard Ethernet packet flow.

In the case when the VC ACK is retried, i.e. the VC RESUME response does not come from the local, the remote re-sends another ACK, limited to maximum ACK Retry limit value. If the ACK Retry limit is reached and no RESUME arrived, the remote MAC switches to non-VC (standard) mode.

In addition, a remote device may receive multiple VC REQUEST frames. This can happen if the local device did not receive the VC ACK frame from the remote or the VC ACK frame had CRC errors. The "remote" device should send an ACK frame for each request received. However, the "remote" may send one VC ACK frame if multiple REQUEST frames are received before an ACK is sent by the "remote". Similarly, a local device may receive multiple VC ACK frames. This could happen if the "remote" did not receive the RESUME frame or the RESUME frame has CRC errors. The local should send an ACK frame for each RESUME frame it receives. However, the local may send one RESUME frame if multiple ACKS are received before a RESUME frame is sent.

Also, if the two VC link partners find during the handshake that the other link partner supports a different version of VC specification, then the two VC devices settle for the lowest common denominator feature set between the two versions.

In general, the pause timer value indicated in the VC Handshake frame should be obeyed. In this way, pause may be asserted during the VC Handshake if required. If a non-zero pause time is specified by the VC Handshake frame, then the receiver of the frame may send further VC Handshake frames, but it should not send normal frames until the Pause time is elapsed (or until pause has been de-asserted).

In order for VC Handshake operation to operate, certain registers need to be set. Guidelines for the design of the VC Handshake mechanism in the MAC are provided below, where the following items may entail the use of multiple registers. Control of VC subsystems, such as enabling handshake, forcing renegotiation, determining manner of function enabling (automatic or software) etc., should be supported. Registers devoted to VC Status should be supported, including a Per Port register, indicating successful completion of VC Handshake and other necessary status information. Registers for the REQUEST phase timer and the REQUEST Retry limit counter, discussed above, need to be included, as well as registers for the ACK phase timer and the ACK Retry limit counter.

Additional registers are required in respective devices for capability negotiation. These include read only VC capability registers indicating the capabilities of local and remote devices and VC Local and Remote Advertisement registers. The VC Advertisement registers are usually a copy of VC Capability, and this is the actual value that is advertised by the local and remote device during the handshake. In this way, software can disable some capabilities in the local and remote devices if desired.

Since the handshake can be initiated by both the link partners, hardware implementation can provide two advertisement'registers per device. For example: 1) VC Local Client Advertisement register (read/write register) containing the values to be advertised in the ACK frame sent during the VC Handshake. This register indicates the client functions supported by the local device (which VC frames will be obeyed by the local side). 2) VC Local Server Advertisement register (read/write register) containing the values to be sent in the RESUME frame sent during the VC Handshake. It indicates the server functions supported by the local device (which VC frames the local side may generate).

In addition, other registers are not strictly required and are thus optional VC registers. For example, a VC device may implement the VC Local and Remote Advertisement register as separate registers for the ACK (client functions) and RESUME (server functions) phases of the Handshake. Thus, the local device may have a VC Remote Advertisement register initialized with the values indicated in the ACK frame received during the VC Handshake. This indicates the client functions supported by the remote device. Similarly, the remote device may have a VC local Advertisement register initialized with the values indicated in the RESUME frames received during the VC Handshake. This indicates the functions supported by the local device.

A VC Functionality Enabled register may also be required that indicates what VC functionality is actually enabled. This may be configured by software or as a result of the VC Handshake.

Lastly, with respect to the VC Handshake triggering, the VC Handshake frames are typically the first frames exchanged between the devices involved. The handshake should immediately follow the link up state. Thus, a reliable indication of link up is required.

VC Capability Exchange

The VC Handshake mechanism allows the link partners to be VC aware. At the same time, VC capabilities are exchanged between the link partners during the ACK and RESUME phases of the handshake. The link partners participating in the VC Handshake must support the VC capability registers, which consist of VC Control, Local VC Capability, Local VC Advertisement and Remote VC Advertisement registers. It is noted that each of these may be a set of registers depending on implementation, for example, if the register size of the device is smaller than the number of VC capability bits. Each type is referred to as a single register to emphasize the parallel nature of the sets.

The exchange of the capabilities is done via the VC Link Advertisement register encoded in the data payload of the VC ACK and RESUME frame. Each bit in this sequence may refer to an individual application op-code or to a collection or related application op-codes. A "1" indicates that a specific capability is enabled and "0" indicates that it is disabled. The intent of VC Capability registers is to provide the required configuration settings for the VC applications supported by both local and remote devices. In addition VC devices may implement Configuration registers which give overall control to enable/disable hardware functionality. The size of all VC Capability registers is recommended to be 32 bits for the initial version.

The bits in each VC capability register can refer to the same functionality. However, the significance depends on whether the register represents the local or remote ability. The following TABLE 1 is an implementation example showing the applications supported in one version of the VC architecture.

TABLE 1

| Bit | Description |
| --- | --- |
| 0 | Device can generate Priority Selective Flow Control frames |
| 1 | Device can obey Priority Selective Flow Control frames |
| 2 | Device can generate Flow ID Selective Flow Control frames |
| 3 | Device can obey Flow ID Selective Flow Control frames |
| 4 | Device can generate Egress Priority Selective Flow Control frames |
| 5 | Device can obey Egress Priority Selective Flow Control frames |
| 31:6 | Reserved. |

Each VC aware device supports the following sets of registers: The Local VC Capability Register is a read only register set. The register defines the set of capabilities of which the local device is capable. The Local VC Advertisement Register is a read/write register set. This register advertises the local VC capability to the remote. It may be initialized in one of two ways: it may be 0 to advertise no abilities by default, and thus software is required to change the register, or it may be copied from the Local VC Ability register.

The Remote VC Advertisement Register is a read only register set, but its value is determined by the VC negotiation. This register is populated by the local when it receives the ACK frame, and by the remote when it receives the RESUME frame during the handshake.

The VC Functionality Enabled Register is a read/write register set. The purpose of this register is to enable the hardware functionality of the indicated VC operations. The default value of this register may be indicated in one of two ways depending on configuration settings and is determined by the result of the VC Handshake frames. The ability to generate a certain VC frame type (that is, to be a server for this operation) is enabled if the device is capable of this function (as indicated in the Local Ability register) and the corresponding VC Frame obey function is advertised by the remote device (as indicated in the Remote Advertisement register). Alternatively, the ability to obey a certain VC frame type (that is, to be a client for this operation) is enabled if the device is capable of this function (as indicated in the Local Ability register) and the remote device is capable of generating that frame type.

VC Frame Format

The VC frame format has been developed to many requirements. Included in these requirements is to provide point-to-point communication, to enable end-to-end communication and enable redirection of packet to a CPU. Other requirements include allowing customer specific functionality, a scalable frame format to allow complex applications, and to enable use of Ethertype for purposes other than VC. The various formats for VC frames are described below.

Figure 8:
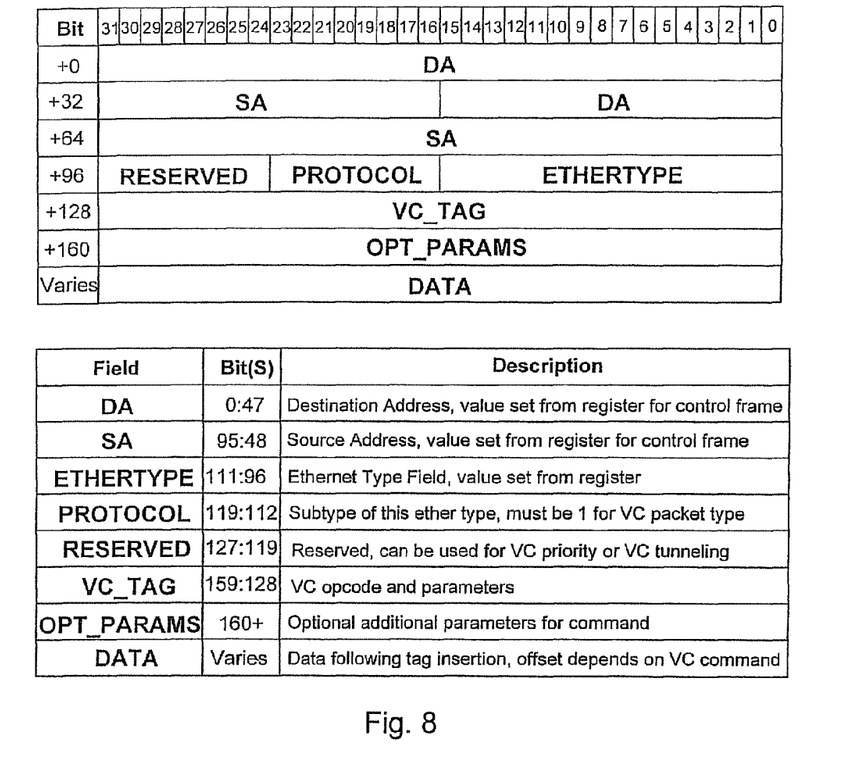
FIG. 8 illustrates an example of VC frame format.

FIG. 8 illustrates one embodiment of the VC frame format. The VC frame is an Ethernet II frame with an Ethertype value assigned by IEEE. The destination MAC address should be the unicast address of the directly connected device or the reserved multicast address 01-80-c2-00-00-01. It is noted that although the reserved multicast address is reserved for IEEE802.3x PAUSE frame, a VC frame with this DA should be sent only when both ends are VC aware.

The source address should be that of the device sending the VC frame. The Ethertype field represents the Ethertype value assigned by IEEE. The Protocol field represents the type of application. For VC applications this field MUST be 1. This field permits applications other than VC to use frames with this Ethertype.

The VC tag may have one of the three formats as discussed below. In the VC_TAG_TYPE0 frame format, illustrated in FIG. 9, the OPCODE0 field is of 8 bits and parameters field is of 24 bits in the first word. The parameter field can be extended is necessary and is really dependent on the o-code.

Figure 9:
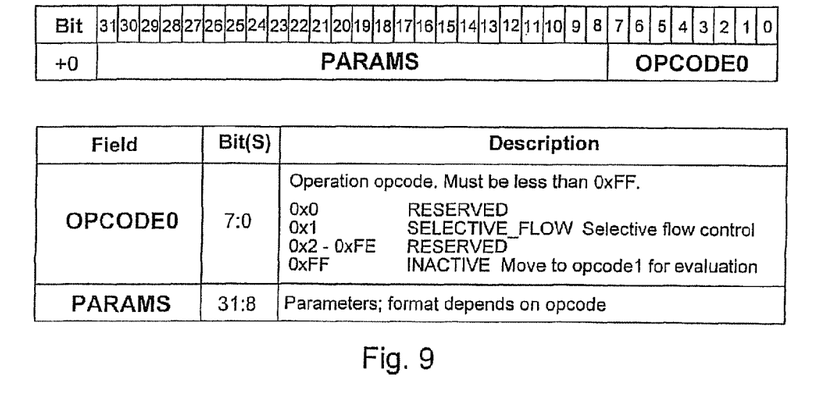
FIG. 9 illustrates an example of VC frame format for Type 0.

The 8-bit Op-code field represents the op-code of an application and the associated function. The value of 0xFF is a reserved value which indicates that the next 8 bits is the op-code value. If the value of OPCODE0 is other than 0xFF, then the fields following the OPCODE0 is a parameter field. The rest of this word may be occupied by parameters for Type 0 opcodes.

Figure 10:
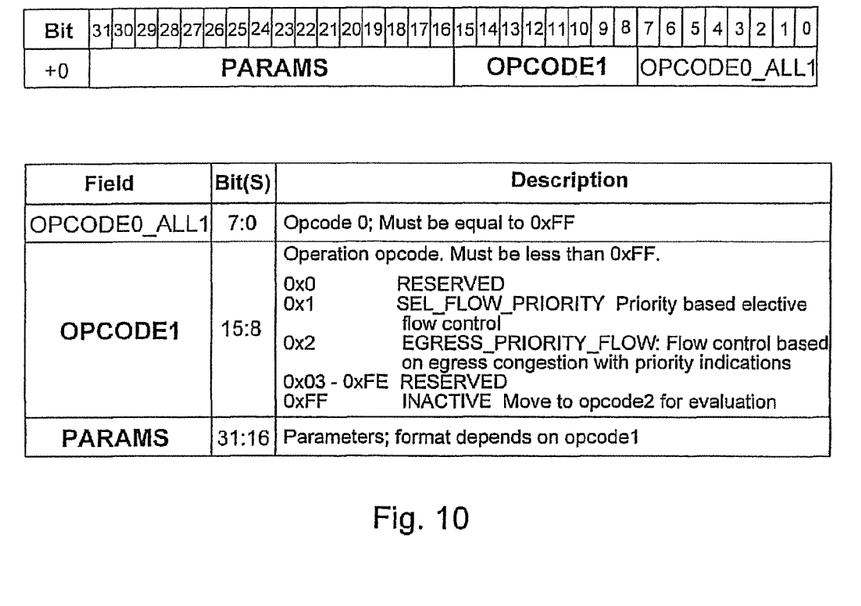
FIG. 10 illustrates an example of VC tag format for Type 1.

In the VC_TYPE_TAG1 VC tag format, illustrated in FIG. 10, the OPCODE0 field is inactive (has a value of 0xFF) and OPCODE1 is active. For OPCODE1 to be active, the value must be less than 0xFF. Up to 16 bits are available for the parameters in the first word. The width of the parameter field is dependent on the OPCODE1 value.

Figure 11:
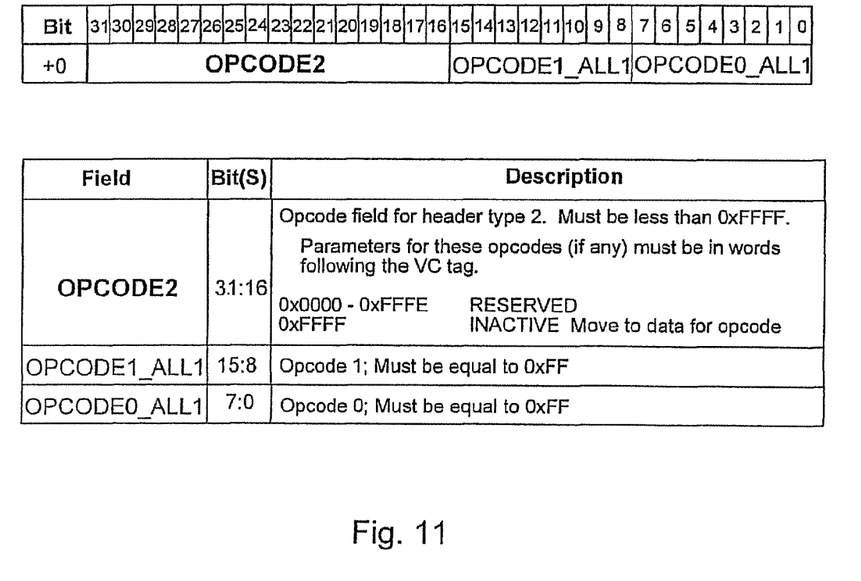
FIG. 11 illustrates an example of VC tag format for Type 2.

In the VC_TYPE_TAG2 VC tag format, illustrated in FIG. 11, the OPCODE0 and OPCODE1 field are inactive and OPCODE2 is active. For OPCODE2 to be active, OPCODE0 must be 0xFF and OPCODE1 MUST be 0xFF. Any parameters to these opcodes must be placed in subsequent words. The format of those depends on the OPCODE2 value.

Selective Flow Control

One of the important applications of the VC protocol is Selective Flow Control (SFC) between a switch and a client. Traditionally, the link level flow control does not differentiate between different types of traffic on a link. A link level flow control completely stops all traffic in that direction thereby creating head of line blocking, as discussed above.

Figure 12:
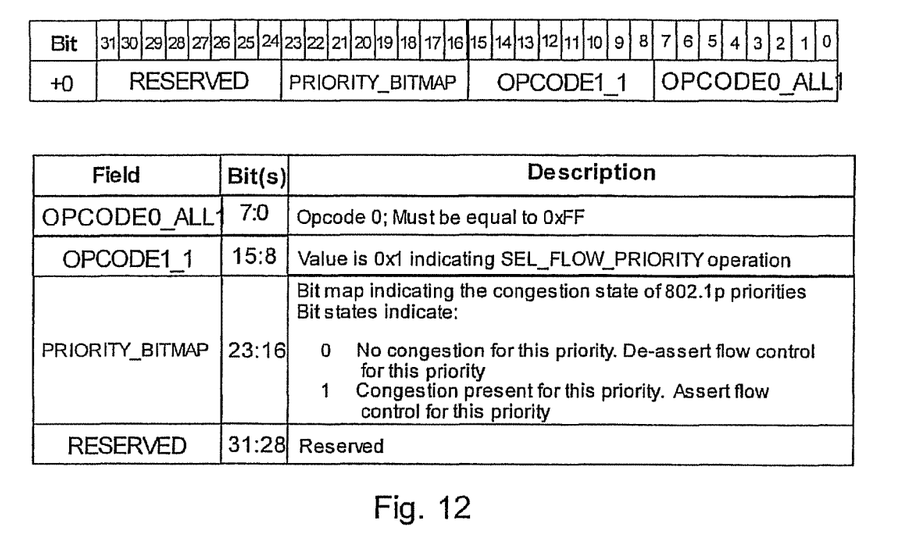
FIG. 12 illustrates an example of VC tag for priority based selective flow control.

The VC protocol provides a mechanism to selectively control a flow on a link while still allowing for the transmission of other flows. There are many ways to classify a flow and there are many mechanisms to apply flow control in such an environment. FIG. 12 shows the VC tag format for 802.1p priority based selective flow control. This is an ingress based flow control. The congestion state of each priority must be accurately reflected in the bitmap passed in these control frames.

Figure 13:
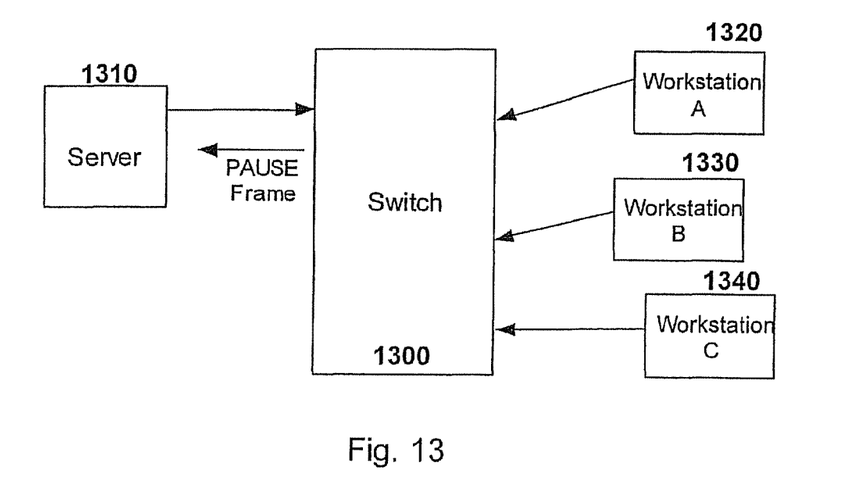
FIG. 13 illustrates an ingress backpressure mechanism.

FIG. 13 shows a specific network configuration. One method of classification of traffic between switch 1300 and clients 1320-1340 is by way of the 802.1p priority, which is in the tag control field of the VLAN tag. In this method of operation, each priority queue within the ingress port is allocated a certain amount of memory by way of setting the backpressure limit threshold for the priority queue. When the number of packets exceeds the threshold a VC frame is sent which then would assert flow control only for the relevant priority queue. Traffic from other priority queues within the client would be unaffected. In FIG. 13, the server 1310 is sending traffic on priority 1 and priority 2.

Following is the sequence of events in this mode of operation. Both ends are VC aware once the VC handshake is successfully completed. 1) The server 1310 sends different priority traffic to the switch 1300. 2) The number of packets per priority queue at the ingress exceeds the pre-defined threshold. This could be if the packets are transmitted out of a slower speed interface. 3) The switch 1300 sends a VC priority based Selective Flow Control frame. 4) On reception, the Server 1310 stops sending traffic for the relevant priority. 5) When the switch ingress port is no longer congested, the switch sends a VC priority based Selective Flow Control Frame to indicate the congestion has cleared. 6) Upon reception of that frame, the Server 1310 resumes sending traffic from the relevant priority queue(s).

An advantage of this implantation is that the method is simple to implement in both the Server and the switch. A disadvantage of this implantation occurs if the server is sending traffic all on one priority, then the selective flow control will behave like pause frame control.

Figure 14:
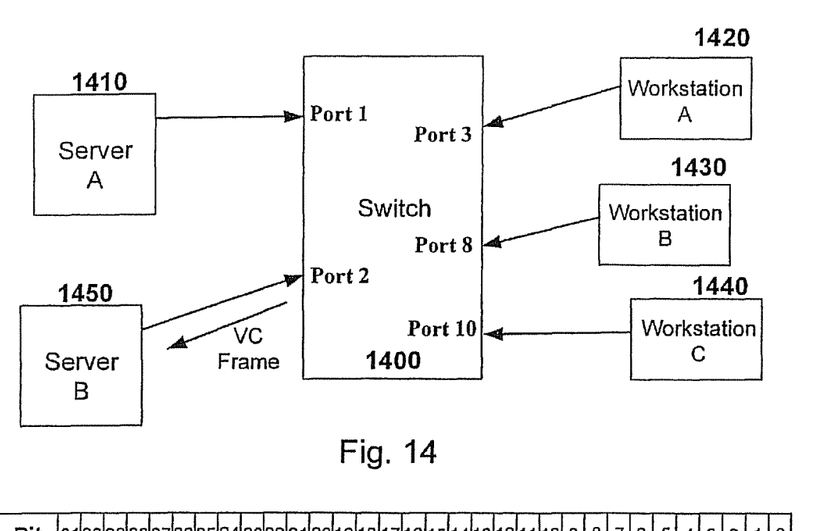
FIG. 14 illustrates an example of flow control due to egress port congestion.

In addition, the priority flow control can be egress based. In this mode of operation, the congestion is detected on the egress port with differentiation based on priority. This results in a VC control frame being sent to other ports when the switch's ingress detects packets being sent to the congested port/priority. The use of such a mode is illustrated in FIG. 14.

The following describes the sequence of events involved in egress based priority flow control. 1) Servers A 1410 and B 1450 are sending traffic to the switch 1400, where the switch also communicates with Workstations 1420-1440 through separate ports. 2) Priority Queue 1 in egress port 3 in switch is congested. An internal message is sent to all switch ports indicating that port 3/priority queue 1 is congested. 3) Switch port 1 sends a VC Priority Flow Control frame to Server A indicating the priority 1 is blocked. 4) Server A decodes the VC frame and stops sending frames from priority queue 1. 5) When switch port 3/priority 1 is no longer congested, an internal message is sent to all the ingress ports. 6) Switch port 1 sends a VC Priority Flow Control frame to Server A indicating the priority 1 is not congested. 7) Server A resumes sending traffic from priority queue 1.

An advantage of this implantation is that the congestion indication is based on egress port and not on ingress port. A disadvantage of this implantation is that head of line blocking occurs within the priority queue of the client.

Egress-Priority Flow Control

A further enhancement to the egress based flow control is to include an abstract flow ID rather than simply a priority queue. The exact mechanism for determining the Flow ID would be negotiated by the two ends, but one example is destination the MAC address of the packet.

In this scenario, the Network Interface Card (NIC) is a client obeying Egress-Priority VC control frames. It is connected to a switch, which will generate these frames. The flow control is achieved by buffering packets in the client. If a packet cannot be absorbed by the switch, a VC frame is sent back to the client which must keep that packet buffered. The client may buffer other packets for the given flow and may assert flow control to the application(s) generating the traffic. At the same time, packets on other flows may be sent to the switch.

Suppose packet X is being sent from the client to the switch. When can the client clear packet X from its buffer? If packet X causes a VC selective flow control packet to be sent from the switch back to the client, then the client must retain packet X in its buffer until either: 1) the packet ages out (by the client's packet aging mechanism); or 2) the client receives a flow de-assertion for the packet X flow; or 3) the pause timer in the client for this flow times out.

For cases 2 and 3, packet X is resent to the switch. Potentially, the switch could again assert flow control for this flow. This would be one way to have persistent pause without requiring the switch side to maintain a timer and resend the pause frame. There is an implicit acknowledgment of packet X when the next non-VC packet is sent from the switch after the start of packet X (that is, enough of packet X to cause a control frame to be sent to the client). The client may free the buffer space used by packet X when it has been transmitted.

Figure 15:
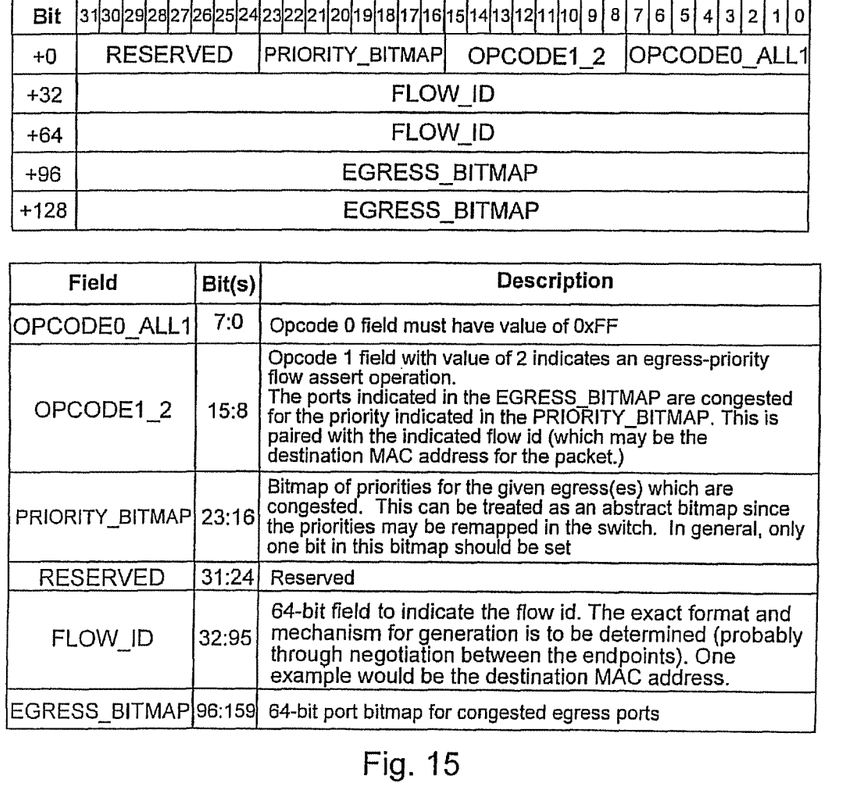
FIG. 15 illustrates an example of egress priority flow assert VC frame format.
Figure 16:
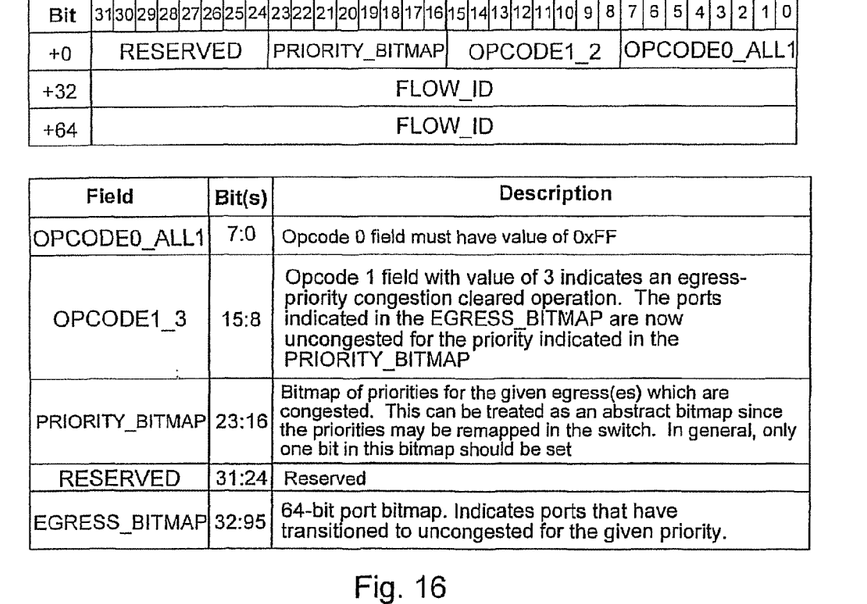
FIG. 16 illustrates an example of egress priority flow de-assert VC frame format.

One embodiment of this Egress-Priority Flow Control is discussed in further detail below. FIGS. 15 and 16 show the formats of Egress Priority Flow Control frames. FIG. 15 illustrates the assert VC frame format and FIG. 16 illustrates the de-assert VC frame format. The use of these frames is discussed below.

First, a mechanism to generate a flow ID from a packet must be agreed upon by the switch and the client. This may be negotiated though the VC handshake or capability exchange. Next, the client maintains an egress packet pool providing random packet access. Calculations indicate that a buffer of approximately 20 kilobytes is needed to accommodate Jumbo frames that could be generated before flow control could be asserted by the switch. A careful analysis is needed to determine the exact buffer size given, jumbo frame support, and/or lossless support, and/or the number of distinct flows supported and whether buffering is required for each.

With respect to the client, within each priority, the egress can be thought of as a collection of queues, one per flow (called flow queues). The congestion status is maintained per flow queue. This can be implemented as a linked list with round robin selection amongst the flow queues. The only flow queues that actually "exist" are those for which a packet is currently present. When a packet is queued to egress in the client, the flow ID is generated. The flow queues within the packet's priority are searched for a matching flow ID. If found; the packet is queued behind other packets with that flow ID. If no match is found, the congestion status is set to "none" and the packet is queued "beside" the other flows in a "new" flow queue.

When a packet at the head of its flow queue has congestion status "none", it may be transmitted to the switch according to the clients scheduling algorithm. If a selective flow control VC frame is received, the congestion status for that queue is set. Otherwise; the egress continues to send packets according to its scheduling algorithm.

On the switch side, congestion status is maintained per port, per priority. In fact, this is the format used to communicate between the switch and the client. The congestion status is actually a combination of a port bitmap and a priority bitmap. This eases the implementation for the following reasons.

For the switch side, the device does not need to keep track of flow IDs (other than calculating them the same way as the client). When congestion is detected, the switch generates a VC frame indicating the congested egress ports for the packet and sets the bit in the priority bitmap that the packet would use in the switch. (The priority indicated here can actually be a remapped priority, but the client doesn't need to worry about that). On the client side, the congestion information for the flow is stored exactly as it appears in the VC flow control frame.

When the ingress of the switch receives a packet for which an egress port of the packet is congested, the packet is dropped. The packet's flow ID is calculated and a VC selective flow control frame (asserting flow control for the given flow ID) is returned to the client with the bitmap described above. When the ingress sees the congestion state of a port clear for a given priority, it generates a VC selective flow control frame with the command to de-assert on the indicated port and priority.

The client takes this frame and modifies the congestion state for each flow queue affected by the change. This may permit queues previously blocked to transmit. It is noted that some other port to which the packet is destined could now be congested forcing again a VC selective flow control assertion.

An advantage of this implantation is that it avoids head of line blocking between flow queues. Disadvantages of this implantation are that different flows may collapse to same flow ID depending on implementation of flow id calculation and the approach may be complicated to implement on both sides.

Standard IEEE 802.3x Flow Control

Figure 17:
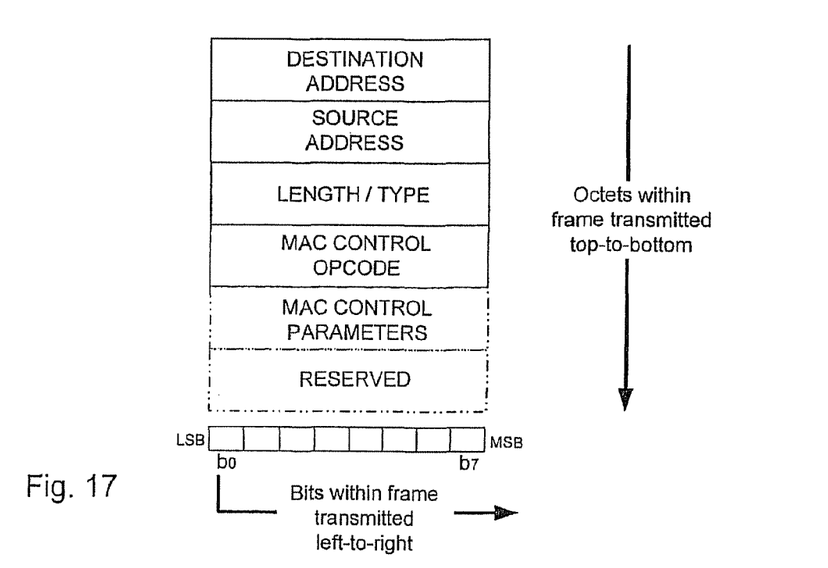
FIG. 17 illustrates an example of MAC control frame format.

The Pause frame is generated by the MAC and comprises MAC Control frames containing MAC client data for the CSMA/CD MAC and are of fixed 64 byte length. MAC Control frames are distinguished from other MAC frames only by their Length/Type field identifier. The format is depicted in FIG. 17.

The PAUSE operation is used to inhibit transmission of data frames for a specified period of time. When the Ethernet switch wants to inhibit transmission of data frames from another station on the network, it generates the MAC Control frame with following fields:

Destination Address=Globally assigned 48-bit multicast address (01-80-C2-00-00-01);
Source Address="don't care: 48 bits";

Length/Type Field=Universally assigned for MAC Control of CSMA/CD LANs (0x88-08);
Op-code control=PAUSE op-code (0x00-01);
Control Parameter=length of time for which to inhibit data frame transmission;
Reserved Fields=42 bytes of Reserved field is transmitted as all zeroes;
FCS=4 bytes of std. CRC computation.

Upon receipt, the MAC Control sub-layer parses the incoming frame to determine whether it is destined for the MAC client (Data frame) or for a specific function within the MAC Control sub-layer entity itself (MAC Control frame). MAC Control frames with a length of 64 bytes and op-code 0x0001 is interpreted as a Pause control frame and acted upon by the MAC Control sub-layer. A frame that does not contain the unique Length/Type field (88-08) is considered a Data frame. The MAC sub-layer may pass up the Data frame. MAC Control frames with a length greater than 64 bytes and op-code 0x0001 may be discarded, or truncated to 64 bytes, interpreted, and acted upon. Unsupported MAC Control frames are discarded. Discarded frames are neither passed to the MAC client nor interpreted nor acted upon by the MAC Control sub-layer, though it could be reported to network management.

The PAUSE operation cannot be used to inhibit transmission of MAC Control frames. Devices configured to the full duplex mode of operation only send the PAUSE frames. The globally assigned 48-bit multicast address 01-80-C2-00-00-01 has been reserved for use in MAC Control PAUSE frames for inhibiting transmission of data frames from a device in a full duplex mode.

IEEE 802.1D-conformant bridges will not forward frames sent to this multicast destination address, regardless of the state of the bridge's ports, or whether or not the bridge implements the MAC Control sub-layer. To allow generic full duplex flow control stations implementing the PAUSE operation instruct the MAC (e.g. through layer management) to enable reception of frames with destination address equal to this multicast address.

Auto-Negotiation

The Auto-negotiation function allows a device to advertise enhanced modes of operation it possesses to a device at the remote end of a link segment and to detect corresponding enhanced operational modes that the other device may be advertising. The complete implementation details on auto-negotiation are explained in IEEE802.3 specifications. The Virtual Channel (VC) capability is established between the two link partners by adding new bits and new registers to the IEEE802.3 specifications.

VC capable devices can use the Next-page feature in the standard Auto-negotiation arbitration mechanism to allow exchange of VC capabilities. The next page format for VC capability exchange is implementation dependent.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method to selectively control a flow of data through a network, the method comprising:
    detecting congestion at a first network device;
    sending a congestion notification message, comprising a priority indication, to a second network device to cause a transmission rate of data destined for the first network device to be reduced according to a priority level; and
    sending a resume message to the second network device when congestion is eased.

2. The method according to claim 1, wherein the detecting of the congestion comprises determining that the congestion is occurring when a number of packets received at a priority queue exceeds a threshold value.

3. The method according to claim 1, wherein the congestion notification message is a table comprising a port bitmap and a priority bitmap.

4. The method according to claim 1, wherein the first network device comprises one or more priority queues that correspond to a plurality of flow identification queues of data.

5. The method according to claim 4, wherein the plurality of flow identification queues are implemented at a link level.

6. The method according to claim 4, wherein the plurality of flow identification queues are implemented according to an Ethernet standard.

7. The method according to claim 1, wherein the congestion notification message is sent over a fiber media according to an Ethernet standard.

8. The method according to claim 1, wherein data of a low priority is paused at the second network device.

9. The method according to claim 1, wherein a transmission rate of data having a high priority is unaffected.

10. The method according to claim 1, wherein a transmission rate of delay sensitive data is unaffected.

11. A system to selectively control a flow of data through a network, the system comprising:
    a processor operable to:
        detect congestion at a first network device;
        send a congestion notification message, comprising a priority indication, to a second network device to cause a transmission rate of data destined for the first network device to be reduced according to a priority level; and
        send a resume message to the second network device when congestion is eased.

12. The system according to claim 11, wherein the processor is operable to determine that congestion is occurring when a number of packets received at a priority queue exceeds a threshold value.

13. The system according to claim 11, wherein the congestion notification message is a table comprising a port bitmap and a priority bitmap.

14. The system according to claim 11, wherein the system comprises one or more priority queues that correspond to a plurality of flow identification queues of data.

15. The system according to claim 14, wherein the plurality of flow identification queues are implemented at a link level.

16. The system according to claim 14, wherein the plurality of flow identification queues are implemented according to an Ethernet link level.

17. The system according to claim 11, wherein the congestion notification message is sent over a fiber media according to an Ethernet standard.

18. The system according to claim 11, wherein data of a low priority is paused at the second network device.

19. The system according to claim 11, wherein a transmission rate of delay sensitive data and data having a high priority is unaffected.

20. A network device operable to communicate according to an Ethernet standard, the network device comprising:
   a processor operable to:
      detect congestion at the network device when a number of packets received at a priority queue exceeds a threshold value;
      send a congestion notification bitmap, comprising at least one priority level and at least one flow identification, to cause a transmission rate of low priority data destined for the network device to be reduced; and
      send a resume message when congestion is eased.

* * * * *